United States Patent
Hyeon et al.

(10) Patent No.: US 12,251,690 B2
(45) Date of Patent: Mar. 18, 2025

(54) SINGLE ATOM CATALYST AND METHOD OF FORMING THE SAME

(71) Applicants: SEOUL NATIONAL UNIVERSITY R&DB FOUNDATION, Seoul (KR); INSTITUTE FOR BASIC SCIENCE, Daejeon (KR)

(72) Inventors: Taeghwan Hyeon, Seoul (KR); Byounghoon Lee, Seoul (KR)

(73) Assignees: SEOUL NATIONAL UNIVERSITY R&DB FOUNDATION, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 822 days.

(21) Appl. No.: 17/418,581

(22) PCT Filed: Jan. 3, 2020

(86) PCT No.: PCT/KR2020/000124
§ 371 (c)(1),
(2) Date: Jun. 25, 2021

(87) PCT Pub. No.: WO2020/141936
PCT Pub. Date: Jul. 9, 2020

(65) Prior Publication Data
US 2022/0062883 A1 Mar. 3, 2022

(30) Foreign Application Priority Data
Jan. 4, 2019 (KR) .................. 10-2019-0001082

(51) Int. Cl.
*B01J 21/06* (2006.01)
*B01J 23/46* (2006.01)
(Continued)

(52) U.S. Cl.
CPC ............. *B01J 35/39* (2024.01); *B01J 21/063* (2013.01); *B01J 23/464* (2013.01); *B01J 23/72* (2013.01);
(Continued)

(58) Field of Classification Search
CPC ........ B01J 21/063; B01J 23/464; B01J 23/72; B01J 23/745; B01J 23/75; B01J 23/755;
(Continued)

(56) References Cited

U.S. PATENT DOCUMENTS 3,883,445 A * 5/1975 Roth ...................... B01J 23/868
  423/213.2
4,260,524 A * 4/1981 Yamada .................... B01J 21/04
  502/527.24

(Continued)

OTHER PUBLICATIONS

Awadallah et al. "Novel aluminosilicate hollow sphere as a catalyst for methane decomposition to Cox-free hydrogen production", Applied Surface Science 287 (2013) 415-422. (Year: 2013).*

(Continued)

*Primary Examiner* — Cam N. Nguyen

(57) ABSTRACT

A single atom catalyst and a method of forming the same are provided. The single atom catalyst comprises a support comprising a first metal oxide and a second metal atom located in the first metal oxide. The method of forming the single atom catalyst comprises forming a sacrificial nanoparticle, coating the sacrificial nanoparticle with a first metal oxide, adsorbing a second metal atom to the first metal oxide, forming a sacrificial layer on the support, and heating the first metal oxide.

6 Claims, 15 Drawing Sheets

(51) Int. Cl.
   *B01J 23/72* (2006.01)
   *B01J 23/745* (2006.01)
   *B01J 23/75* (2006.01)
   *B01J 23/755* (2006.01)
   *B01J 35/39* (2024.01)
   *B01J 35/51* (2024.01)
   *B01J 37/00* (2006.01)
   *B01J 37/02* (2006.01)
   *B01J 37/04* (2006.01)
   *B01J 37/08* (2006.01)

(52) U.S. Cl.
   CPC ............ *B01J 23/745* (2013.01); *B01J 23/75* (2013.01); *B01J 23/755* (2013.01); *B01J 35/51* (2024.01); *B01J 37/0018* (2013.01); *B01J 37/0207* (2013.01); *B01J 37/0221* (2013.01); *B01J 37/04* (2013.01); *B01J 37/082* (2013.01)

(58) Field of Classification Search
   CPC ........ B01J 35/39; B01J 35/51; B01J 37/0018; B01J 37/0207; B01J 37/0221; B01J 37/04; B01J 37/082
   USPC ................... 502/327, 335–338, 346, 350
   See application file for complete search history.

(56) References Cited

U.S. PATENT DOCUMENTS

| | | | | |
|---|---|---|---|---|
| 4,793,980 A * | 12/1988 | Torobin | ..................... | C08J 9/32 95/137 |
| 6,797,669 B2 * | 9/2004 | Zhang | ..................... | B01J 23/44 502/328 |
| 7,618,918 B2 * | 11/2009 | Estenfelder | ............. | B01J 35/40 549/248 |
| 7,718,569 B2 * | 5/2010 | Ng | ....................... | B01J 19/2485 585/277 |
| 7,910,518 B2 * | 3/2011 | Pak | ....................... | C07D 301/08 502/313 |
| 8,852,519 B2 * | 10/2014 | Watanabe | ................ | B01J 23/63 502/262 |
| 9,358,533 B2 * | 6/2016 | Tran | ....................... | B01J 37/082 |
| 10,472,303 B2 * | 11/2019 | Krause | ................... | B01J 23/862 |
| 11,167,281 B2 * | 11/2021 | Vardon | ................... | B01J 21/04 |
| 11,471,865 B2 * | 10/2022 | Tait | ....................... | B01J 37/0209 |
| 11,623,205 B2 * | 4/2023 | Wyman | ................... | B01J 37/08 44/329 |
| 2009/0136816 A1 * | 5/2009 | Kang | ................. | B01J 20/28014 429/502 |
| 2012/0118318 A1 * | 5/2012 | Hillebrandt Poulsen | .................... | C09D 7/62 134/1 |
| 2014/0138586 A1 * | 5/2014 | Meese-Marktscheffel | ................. B01J 35/615 252/373 |
| 2018/0170799 A1 * | 6/2018 | Hillebrandt Poulsen | .................... C03C 12/02 |

OTHER PUBLICATIONS

Yuanzhe Piao et al., "Wrap-bake-peel process for nanostructural transformation from -FeOOH nanorods to biocompatible iron oxide nanocapsules," Nature Materials, Feb. 17, 2008, pp. 242-247, vol. 7.

Tim Leshuk et. al., "Mesoporous Hollow Sphere Titanium Dioxide Photocatalysts through Hydrothermal Silica Etching," Applied Materials and Interfaces, Oct. 30, 2012, pp. 6062-6070.

Rajesh J. Tayade et al., "Transition Metal Ion Impregnated Mesoporous TiO2 for Photocatalytic Degradation of Organic Contaminants in Water," Ind. Eng. Chem. Res., Jun. 14, 2006, pp. 5231-5238, V. 45.

Leo DeRita et al., "Catalyst Architecture for Stable Single Atom Dispersion Enables Site-Specific Spectroscopic and Reactivity Measurements of CO Adsorbed to Pt Atoms, Oxidized Pt Clusters, and Metallic Pt Clusters on TiO2," Journal of the American Chemical Society, Sep. 13, 2017, pp. 14150-14165.

* cited by examiner

Bare TiO$_2$   Ti vacancy   O vacancy

Atop Ti   Hollow   Bridge

SINGLE ATOM CATALYST AND METHOD OF FORMING THE SAME

TECHNICAL FIELD

The present invention relates to a single atom catalyst and a method of forming the same.

BACKGROUND ART

The reversible and cooperative activation processe, which includes electron transfer from surrounding redox mediators, reversible valence change of cofactors, and macroscopic functional/structural change, is one of the most important characteristics of biological enzymes, and has been frequently used in designing homogeneous catalysts. However, There is nearly no report on industrially important heterogeneous catalysts with these enzyme-like characteristics.

Heterogeneous photocatalysts have many potential applications such as hydrogen production, $CO_2$ conversion, water treatment and organic synthesis. In order to achieve high efficiency and selectivity in these applications, the electronic band structures of cocatalysts and their interactions with light absorbers should be investigated, along with the intrinsic light-absorbing properties of the photocatalysts. However, it is difficult to understand the mechanism during photocatalytic reaction atomically because the position and valence of the cocatalysts are difficult to control at the atomic level.

DISCLOSURE

Technical Problem

In order to solve the above mentioned problems, the present invention provides a single atom catalyst having good performance.

The present invention provides method of forming the single atom catalyst.

The other objects of the present invention will be clearly understood by reference to the following detailed description and the accompanying drawings.

Technical Solution

A single atom catalyst according to the embodiments of the present invention comprises a support comprising a first metal oxide and a second metal atom located in the first metal oxide.

A method of forming a single atom catalyst according to the embodiments of the present invention comprises forming a sacrificial nanoparticle, coating the sacrificial nanoparticle with a first metal oxide, adsorbing a second metal atom to the first metal oxide, forming a sacrificial layer on the support, and heating the first metal oxide.

Advantageous Effects

A single atom catalyst according to embodiments of the present invention may have good performance. The single atom catalyst can achieve uniquely improved catalytic performance by adjusting local atomic composition for a single atom fixed to a support. In addition, the single atom catalyst may have good photocatalytic properties. The single atom catalyst can be easily formed in a simple way.

BEST MODE

Figure 1:
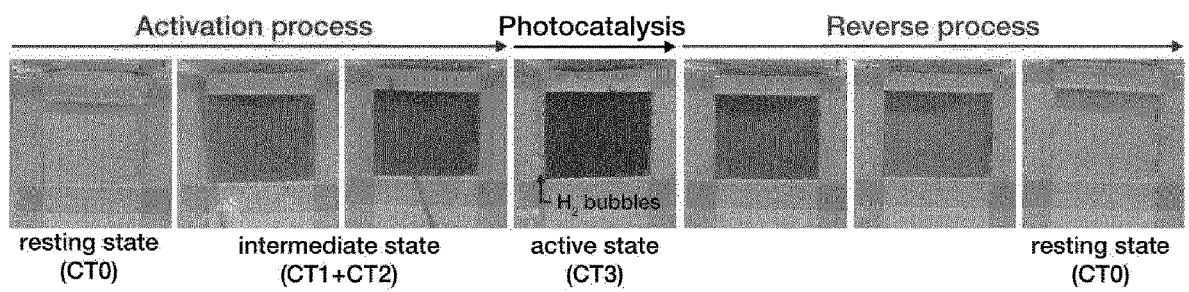
FIG. 1 shows images of $Cu/TiO_2$ at various states of the photocatalysis cycle.

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

Terms like 'first', 'second', etc., may be used to indicate various components, but the components should not be restricted by the terms. These terms are only used to distinguish one element, component, region, layer or section from another region, layer or section. A first element, component, region, layer or section could be termed a second element, component, region, layer or section without departing from the teaching of the embodiments of the present invention.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

A single atom catalyst according to the embodiments of the present invention comprises a support comprising a first metal oxide and a second metal atom located in the first metal oxide.

The second metal atom may be located in a first metal vacancy in the first metal oxide. The first metal oxide may comprise $TiO_2$. The second metal may comprise a transition metal. The second metal may comprise at least one of Cu, Fe, Co, Ni, and Rh.

The support may have a hollow spherical shape. The first metal oxide may have crystalline property.

The single atom catalyst may be activated by light irradiation and deactivated by exposure to oxygen.

A method of forming a single atom catalyst according to the embodiments of the present invention comprises forming a sacrificial nanoparticle, coating the sacrificial nanoparticle with a first metal oxide, adsorbing a second metal atom to the first metal oxide, forming a sacrificial layer on the support, and heating the first metal oxide.

The first metal oxide may comprise $TiO_2$. The second metal may comprise a transition metal. The second metal may comprise at least one of Cu, Fe, Co, Ni, and Rh. The first metal oxide may be changed from amorphous to crystalline by the heating. The second metal atom may be disposed in a first metal vacancy of the first metal oxide by the heating.

The sacrificial nanoparticle and the sacrificial layer may be formed with $SiO_2$.

The method may further comprise removing the sacrificial nanoparticle and the sacrificial layer.

[Formation Example of a Single Atom Catalyst]

A method of forming a single atom catalyst according to an embodiment of the present invention comprises forming a $SiO_2$ nanoparticle, coating the $SiO_2$ nanoparticle with $TiO_2$, adsorbing transition metal atoms to the $TiO_2$, and coating the $TiO_2$ with $SiO_2$, heating the $TiO_2$, and removing the $SiO_2$ nanoparticle and $SiO_2$ coating layer.

1) Forming a $SiO_2$ Nanoparticle $SiO_2$ nanoparticles are formed. The $SiO_2$ nanoparticles can be formed by a sol-gel reaction. For example, the $SiO_2$ nanoparticles can be formed by adding TEOS (0.86 mL) to a solution containing ethyl alcohol (23 mL), $H_2O$ (4.3 mL) and aqueous ammonia (0.6 mL) at room temperature and vigorously stirring for about 6 hours. The $SiO_2$ nanoparticles are centrifuged, washed with water and ethyl alcohol, and then dispersed in ethyl alcohol. The $SiO_2$ nanoparticles may have a spherical shape.

2) Coating the $SiO_2$ Nanoparticle with $TiO_2$

The $SiO_2$ particles are coated with $TiO_2$. The nanoparticles are dispersed in 40 mL of anhydrous ethyl alcohol to form a $SiO_2$ nanoparticle solution. 14 mL of pure acetonitrile and 0.4 mL of aqueous ammonia (28-30 wt %) are added to the $SiO_2$ nanoparticle solution to form a first mixed solution. The amount of the aqueous ammonia in the first mixed solution affects the kinetics of the $TiO_2$ coating. The $SiO_2$ nanoparticles are well dispersed by sonicating the first mixed solution for 10 minutes. A second mixed solution is formed by dissolving 0.8 mL of TBOT (Titanium (IV) n-butoxide) in a mixed solution of 6 mL of anhydrous ethyl alcohol and 2 mL of acetonitrile. The first mixed solution and the second mixed solution are mixed and stirred for about 3 hours to coat the $SiO_2$ nanoparticles with $TiO_2$. The resulting white solution is centrifuged and washed with ethyl alcohol and water. The $SiO_2$ nanoparticles coated with $TiO_2$ ($SiO_2$@$TiO_2$ nanoparticles) are dispersed in 40 mL of $H_2O$.

3) Adsorbing Transition Metal Atoms to the $TiO_2$

The transition metal atoms are adsorb to the $TiO_2$. Metal chloride hydrates ($FeCl_3 \cdot 6H_2O$, $CoCl_2 \cdot 3H_2O$, $NiCl_2 \cdot 6H_2O$, $CuCl_2 \cdot 2H_2O$ and $RhCl_3 \cdot xH_2O$) are used as metal precursors. 4.0 mg of metal chloride is added to 40 mL of a colloidal solution of the $SiO_2$@$TiO_2$ nanoparticles. The mixed colloidal solution is vigorously stirred at room temperature for 3 hours to adsorb the metal atoms to the $TiO_2$ of the $SiO2$@$TiO2$ nanoparticles. The $SiO_2$@$TiO_2$ nanoparticles to which the metal atoms are adsorbed ($SiO_2$@M/$TiO_2$ nanoparticles) are centrifuged and washed with water. Although the color of $SiO_2$@$TiO_2$ nanoparticles is white, the color of the nanoparticles changes due to the metal ion adsorption, and the color changes depending on the adsorbed metal atom (Fe: yellow, Co: blue, Ni: green, Cu: light blue, Rh: Orange).

4) Coating the $TiO_2$ with $SiO_2$

A $SiO_2$ coating layer is formed on the $TiO_2$ to which the transition metal atoms are adsorbed. The $SiO_2$@M/$TiO_2$ nanoparticles are dispersed in 40 mL of $H_2O$. PVP (0.4 g) is added and the solution is stirred overnight to adsorb PVP on the surface of $SiO_2$@M/$TiO_2$ nanoparticles. After PVP adsorption, the product is separated by centrifugation and redispersed in a solution of ethanol (46 mL) and $H_2O$ (8.6 mL) by strong sonication for 10 min. Then, 1.2 mL of aqueous ammonia (28-30 wt %) and 1.6 mL of tetraethyl orthosilicate (TEOS) are added to the solution. Immediate stabilization of the adsorbed metal atoms on the surface causes a rapid color change within 10 seconds and forms a $SiO_2$ coating layer. After 4 hours of reaction, the $SiO_2$@M/$TiO_2$ nanoparticles having the $SiO_2$ coating layer ($SiO_2$@M/$TiO_2$@$SiO_2$ nanoparticles) are washed with ethanol and water. $SiO_2$@M/$TiO_2$@$SiO_2$ nanoparticles are centrifuged, dried in air at 80° C., and ground with a mortar to achieve uniformity.

5) Heating the $TiO_2$

The $TiO_2$ is heated. In order to spatially limit the redistribution of metal atoms, an annealing process in which dry $SiO_2$@M/$TiO_2$ nanoparticle powder is calcined at 900° C. for 2 hours is performed. It is preferable to supply sufficient oxygen in the annealing process. By the heating, the $TiO_2$ changes from amorphous to crystalline, and the transition metal atoms are disposed in the Ti vacancies.

6) Removing the $SiO_2$

The $SiO_2$ nanoparticle and the $SiO_2$ coating layer are removed. For $SiO_2$ etching, calcined $SiO_2$@M/$TiO_2$ nanoparticles are dispersed in 0.5 M NaOH solution. The solution is heated to 90° C. with continuous stirring. After 6 hours, the product is separated by centrifugation and washed with $H_2O$ and ethyl alcohol to obtain M/$TiO_2$. The M/$TiO_2$ is dried in an electric oven at 80° C. Thereby, a single atom catalyst is formed. The $TiO_2$ functions as a support or co-catalyst of a single atom catalyst. In addition, the $TiO_2$ may have crystalline property and may have a hollow spherical shape.

FIG. 1 shows images of Cu/TiO at various states of the photocatalysis cycle, and FIG. shows the photocatalysis cycle of Cu/TiO$_2$.

Figure 2:
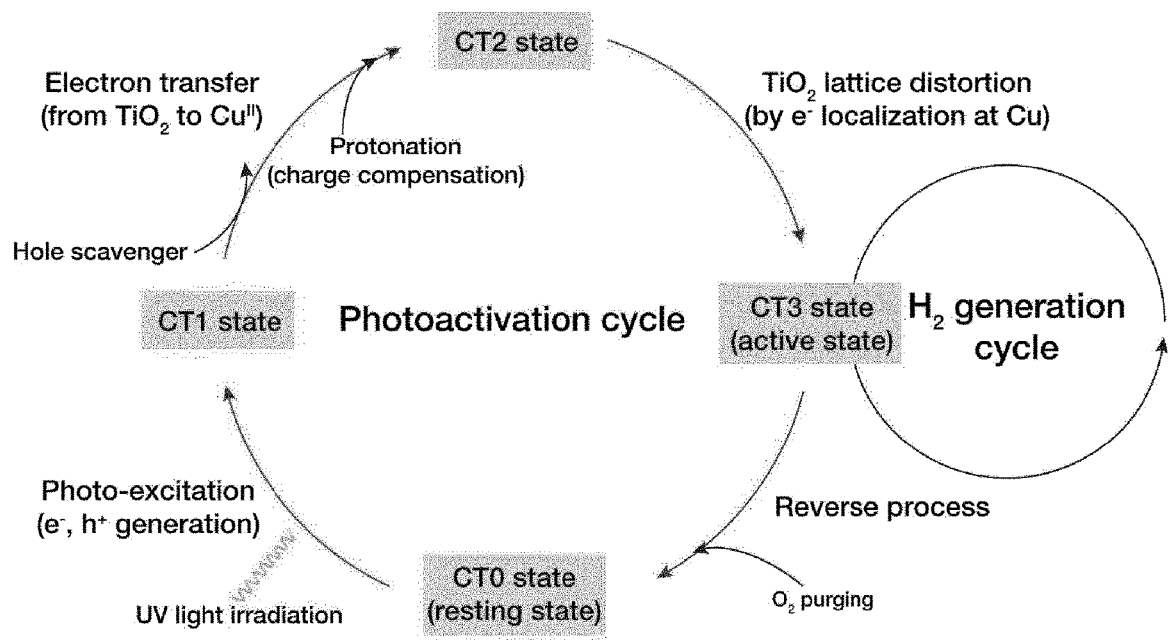
FIG. 2 shows the photocatalysis cycle of $Cu/TiO_2$.

Referring to FIGS. 1 and 2, the single atom Cu/TiO$_2$ catalyst according to an embodiment of the present invention is a site-specific single atom catalyst and undergoes a unique photoactivation process under photocatalytic H$_2$ generation reaction conditions. The color of Cu/TiO$_2$ changes from white to black after light irradiation in a 3:1 (v/v) water-methanol solution under Ar atmosphere. Black Cu/TiO$_2$ retains its color and efficiently generates H$_2$ even after the light is turned off under Ar atmosphere. When exposed to O$_2$ without light irradiation, the color returns to its original white color and the photoactivation cycle is completed.

The single atom Cu/TiO$_2$ catalyst initially has isolated copper atoms and TiO$_2$ in a dormant state and an inactive state (CTO state). By absorbing light generating electrons and holes, the CTO state is changed to a photo-excited state (CT1 state). The photo-generated electrons move from the conduction band of the TiO$_2$ to the d-orbital of the isolated copper atom. The extra charge is compensated by oxygen protonation, resulting in a valence change of the isolated copper atom of redox activity (CT2 state). The trapped electrons in the copper d-orbital induce a polarization field, resulting in localized TiO$_2$ lattice distortion around the isolated copper atom (CT3 state). The CT3 state exhibits completely different photoelectrochemical properties and greatly enhances the photocatalytic H$_2$ generating activity. The active CT3 state can easily revert to the original dormant CTO state upon brief exposure to O$_2$ for several minutes in the dark. This cooperative and reversible interaction between the isolated copper atoms and adjacent TiO$_2$ is fundamentally similar to enzymes and related biomimetic homogeneous catalysts, unlike traditional heterogeneous catalysts.

Figure 3:
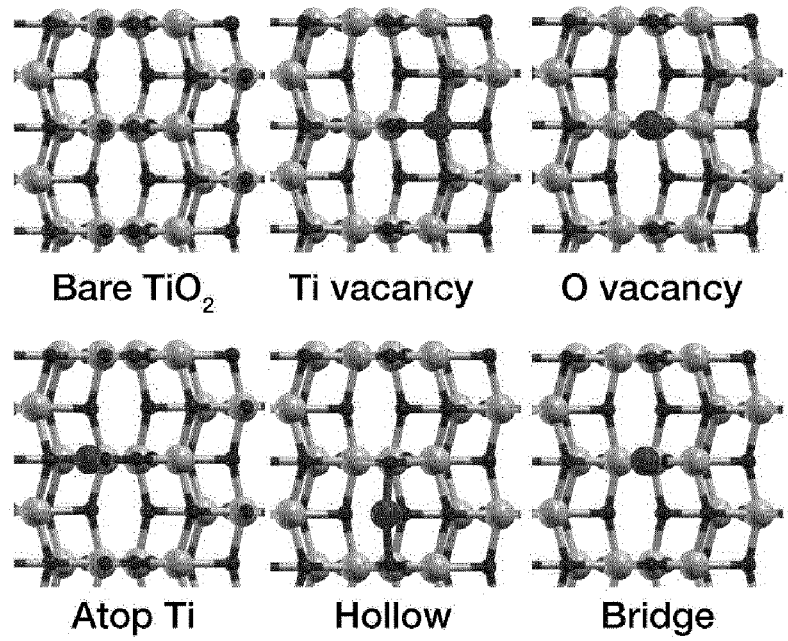
FIG. 3 shows candidate binding sites for single metal atoms on the surface of $TiO_2$ anatase (101).
Figure 4:
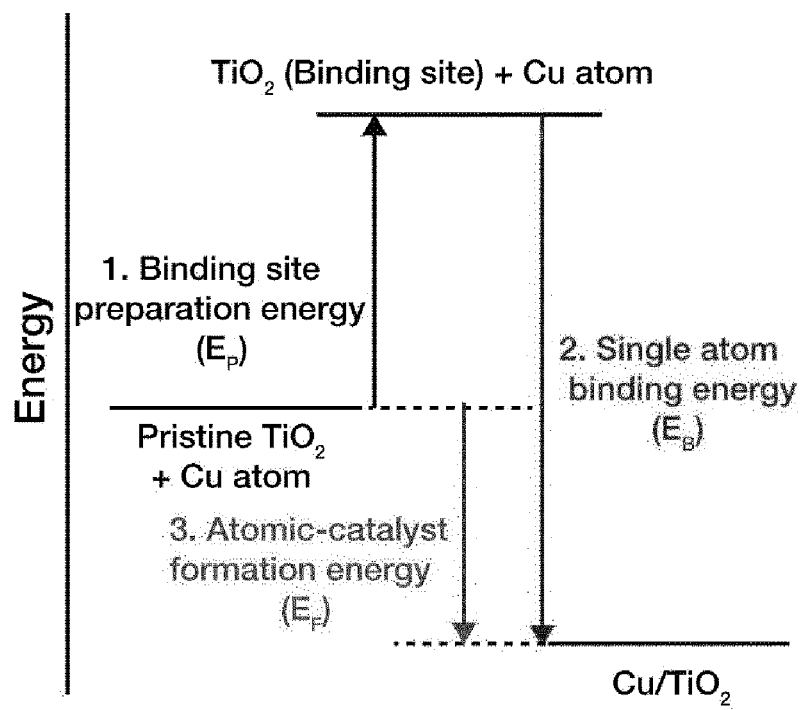
FIG. 4 shows the Born-Haber thermodynamic cycle for calculating single atom catalyst formation energies.
Figure 5:
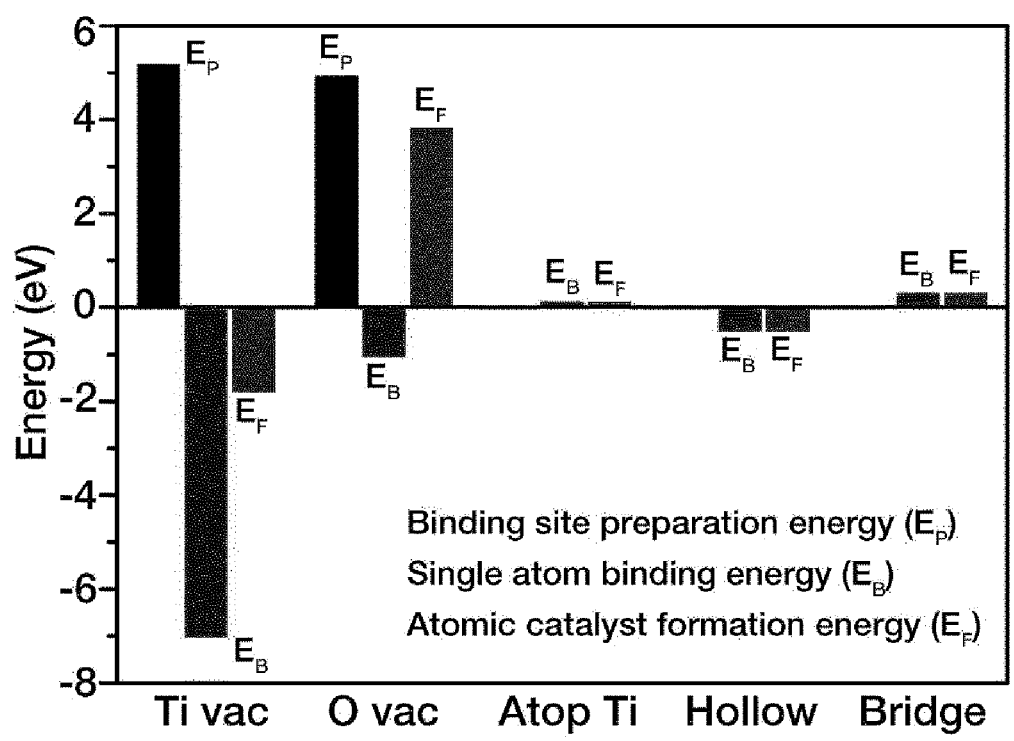
FIG. 5 shows the Born-Haber energy components for possible single atom binding sites calculated using DFT (density functional theory).
Figure 6:
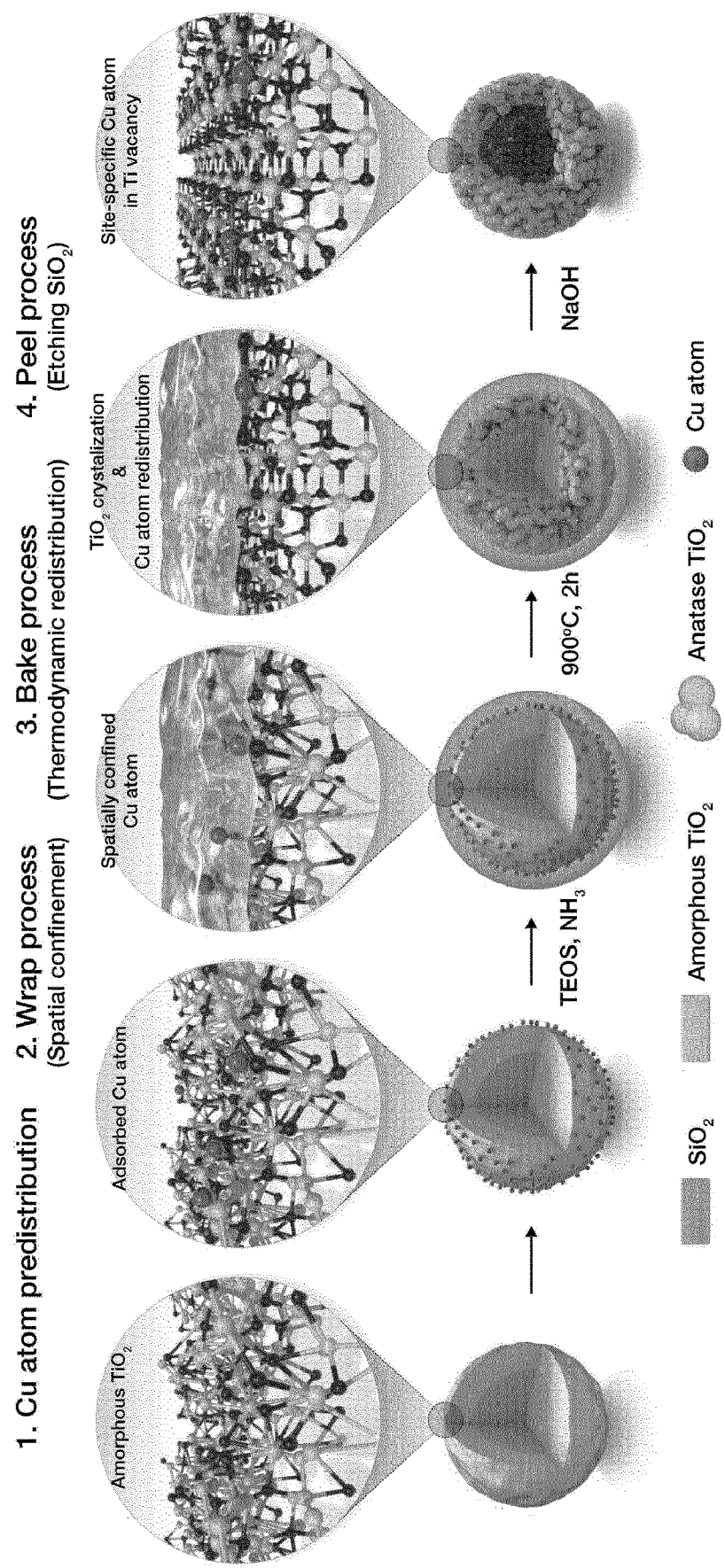
FIG. 6 shows a formation process of a single atom $Cu/TiO_2$ photocatalyst.

FIG. 3 shows candidate binding sites for single metal atoms on the surface of TiO$_2$ anatase (101) and FIG. 4 shows the Born-Haber thermodynamic cycle for calculating single atom catalyst formation energies. FIG. 5 shows the Born-Haber energy components for possible single atom binding sites calculated using DFT (density functional theory) and FIG. 6 shows a formation process of a single atom Cu/TiO$_2$ photocatalyst.

Referring to FIGS. 3 to 6, for the synthesis of site-specific single atom catalysts, candidate binding sites capable of stabilizing copper atoms on the TiO$_2$ anatase (101) surface are identified, the energetics involved in the binding process is determined, and density functional theory (DFT) can be used to design and synthesize exclusively single atom catalysts at vacancy-aided binding sites.

The formation energy ($E_F$) of the single atom catalysts can be simplified using the Born-Haber cycle which includes the binding site preparation energy ($E_P$) for a single atom and the single atom binding energy ($E_B$) of the prepared binding site ($E_F = E_P + E_B$). Based on the calculated energy component, candidate sites can be classified into sites requiring Ep and sites not requiring Ep. The three sites that do not require Ep (atop Ti site, hollow site and bridge site) are classified as surface binding sites, whereas the two binding sites that require Ep require vacancy-aided binding sites requiring high external energy for vacancy formation. The DFT results show that the synthesis must be controlled by thermodynamics to ensure binding at Ti vacancies rather than O vacancies. The surface is coated with a SiO$_2$ overlayer to prevent diffusion, and a high-temperature heat treatment is performed to incorporate metal atoms into only the most stable Ti vacancies on the TiO$_2$.

The single atom Cu/TiO$_2$ photocatalyst may be formed by 1) coating SiO$_2$ nanoparticles with TiO$_2$ and adsorbing metal atoms to the TiO$_2$ (Cu atom predistribution), 2) coating the TiO$_2$ with SiO$_2$ overlayer (Wrap process), 3) performing a heat treatment at 900° C. (Bake process), 4) etching and removing the SiO$_2$ (Peel process).

Figure 7:
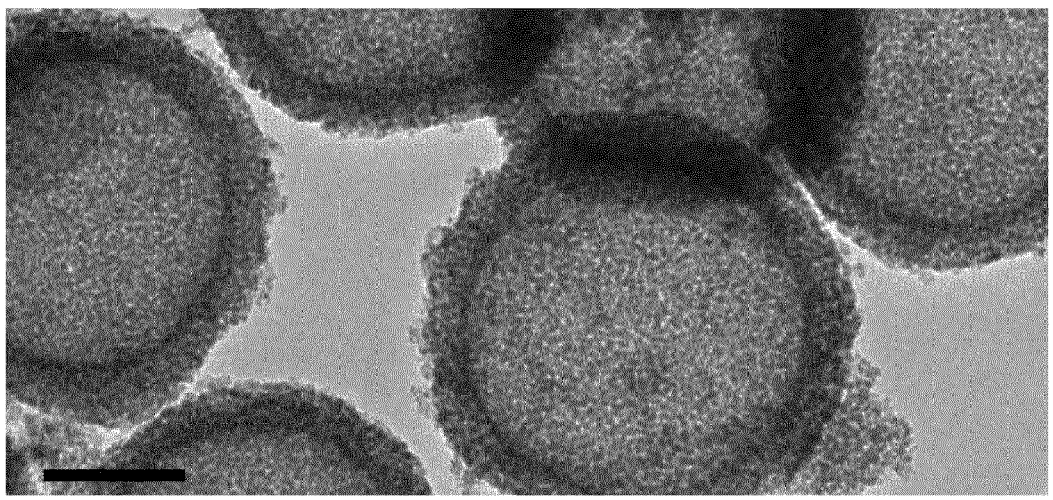
FIG. 7 shows a TEM image of $Cu/TiO_2$.
Figure 8:
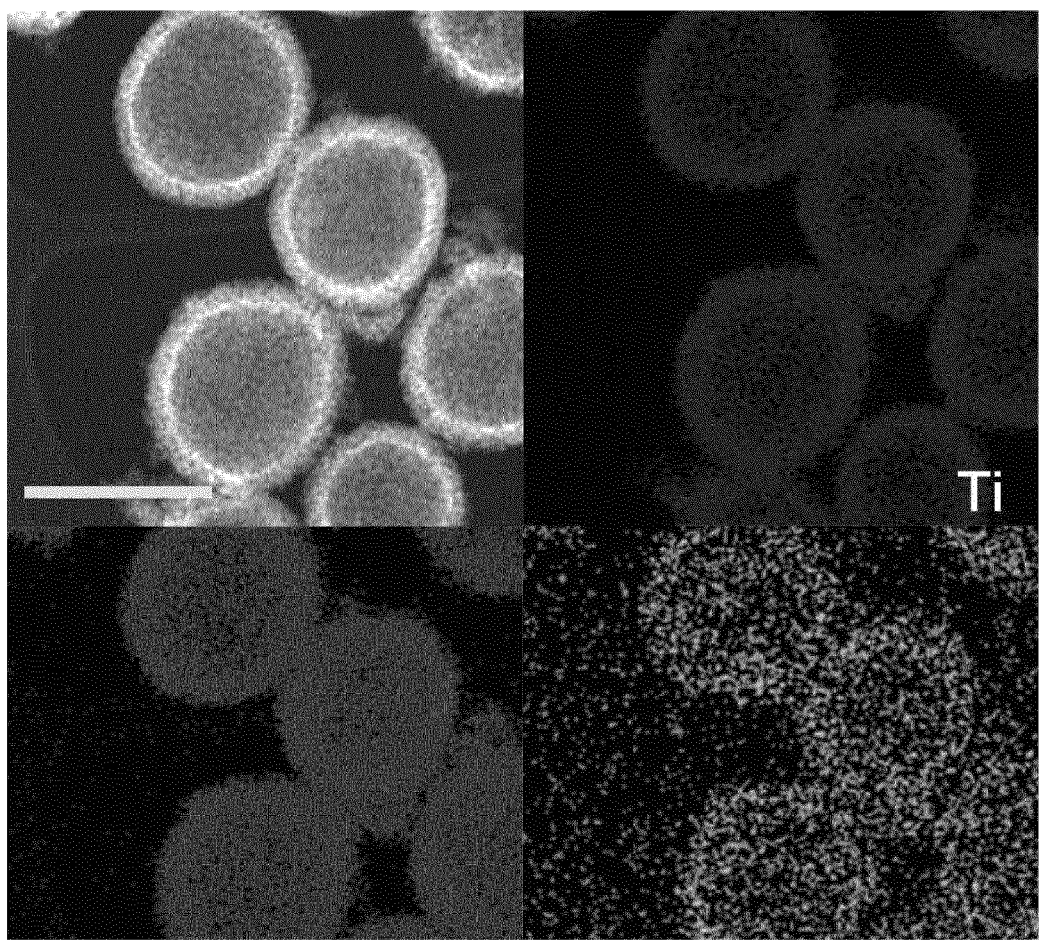
FIG. 8 shows STEM-EDS elemental mapping of $Cu/TiO_2$.
Figure 9:
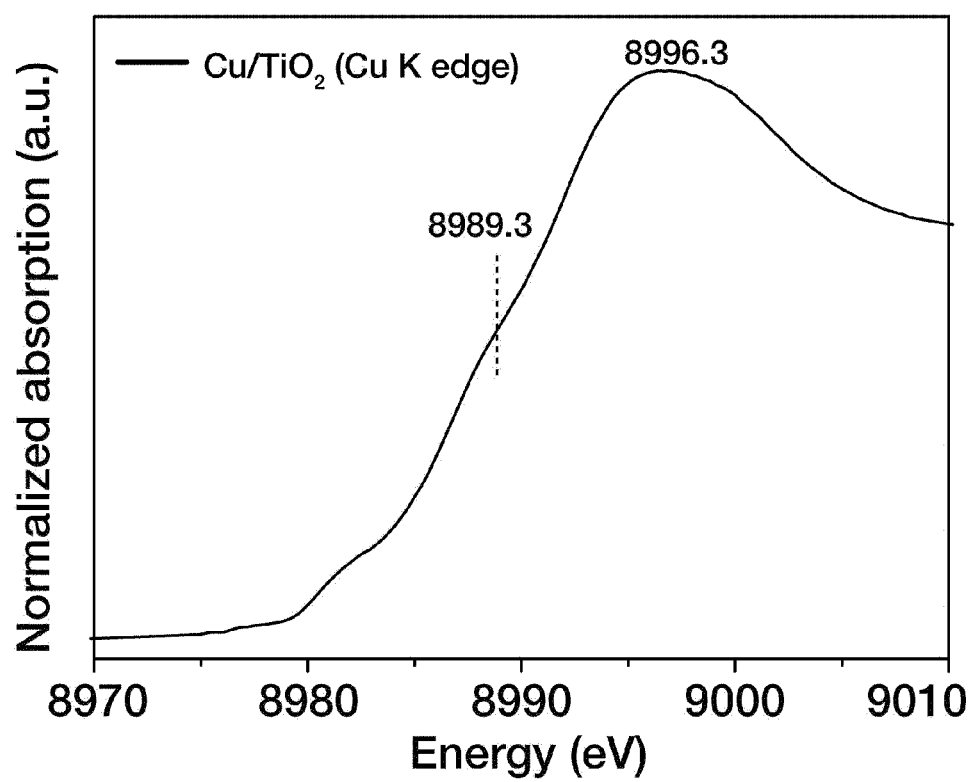
FIG. 9 shows Cu K-edge XANES spectra of $Cu/TiO_2$.
Figure 10:
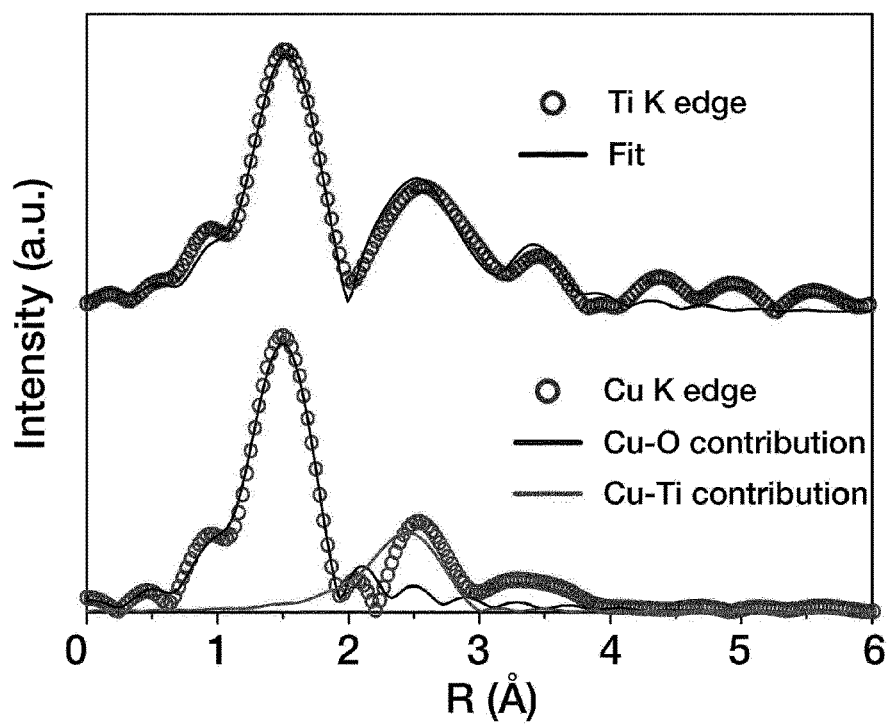
FIG. 10 shows EXAFS spectra and analysis of $Cu/TiO_2$ at Ti and Cu K-edges.
Figure 11:
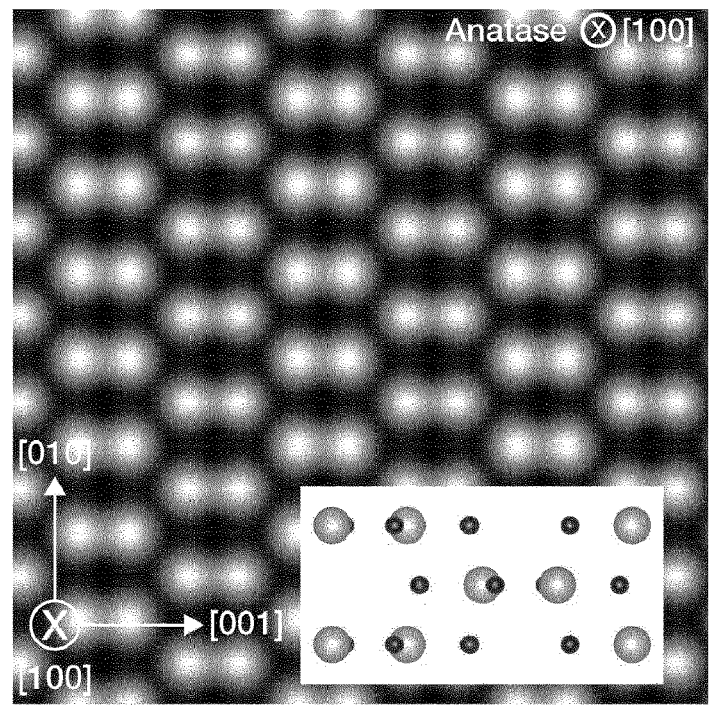
FIG. 11 shows simulated HAADF-STEM image of anatase $TiO_2$.
Figure 12:
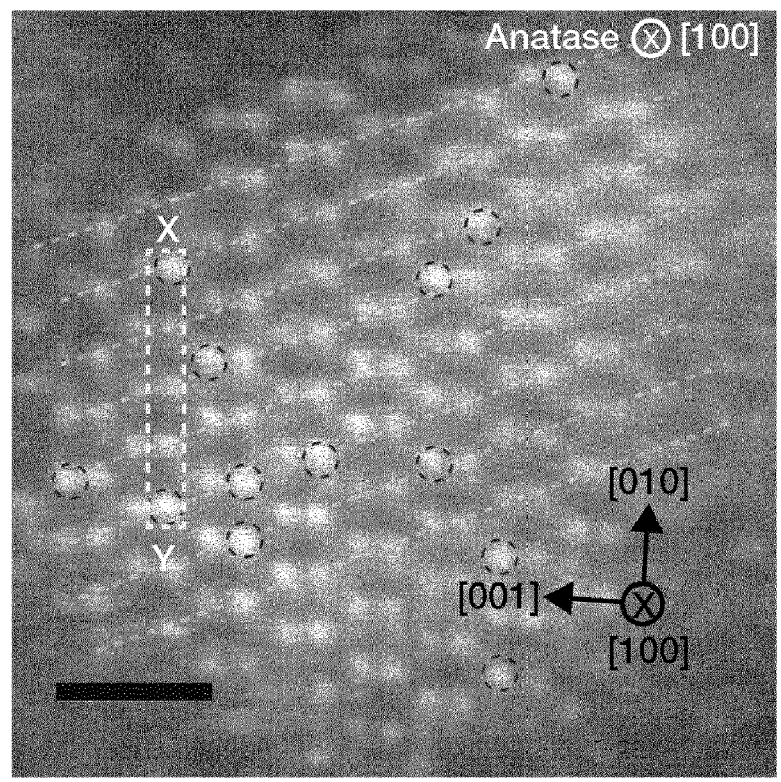
FIGS. 12 and 13 are Cs-corrected HAADF-STEM image of anatase $TiO_2$.
Figure 13:
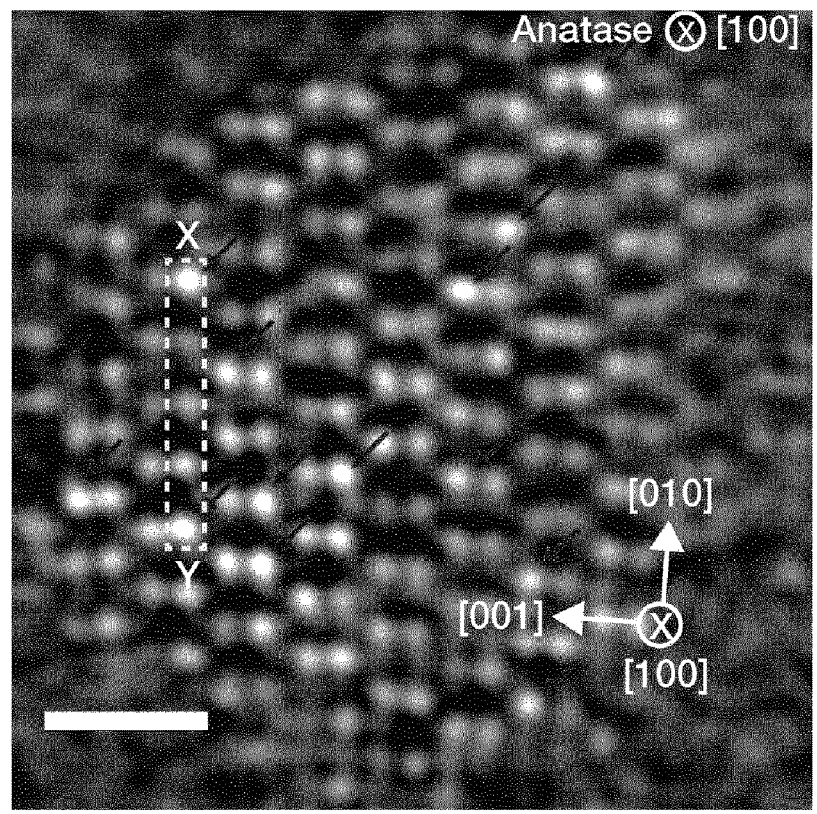
Figure 14:
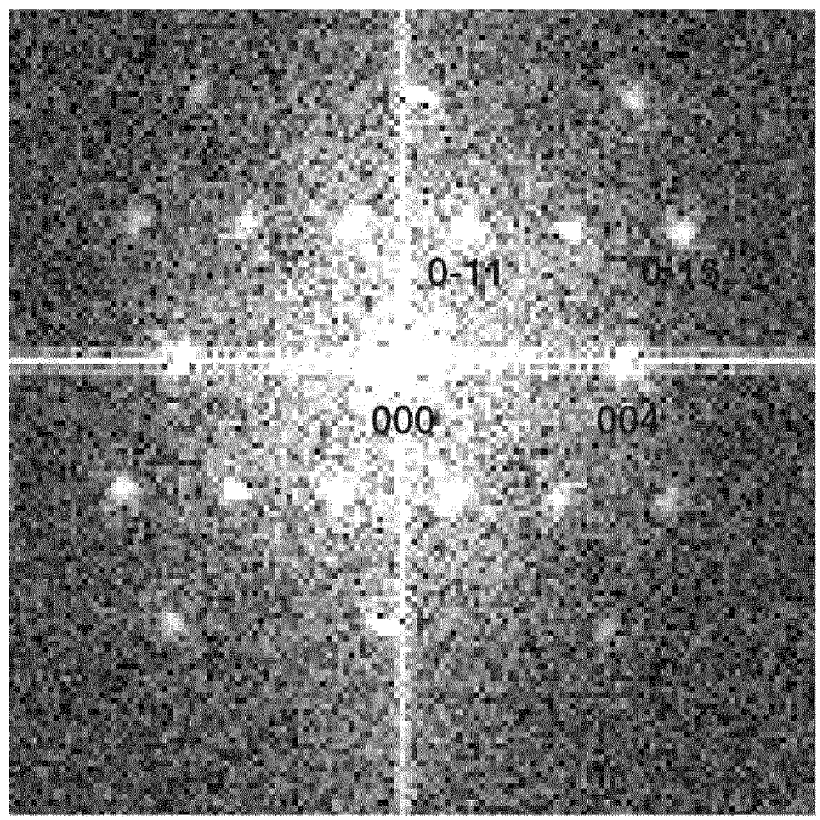
FIG. 14 shows Fourier transform pattern of $Rh/TiO_2$.
Figure 15:
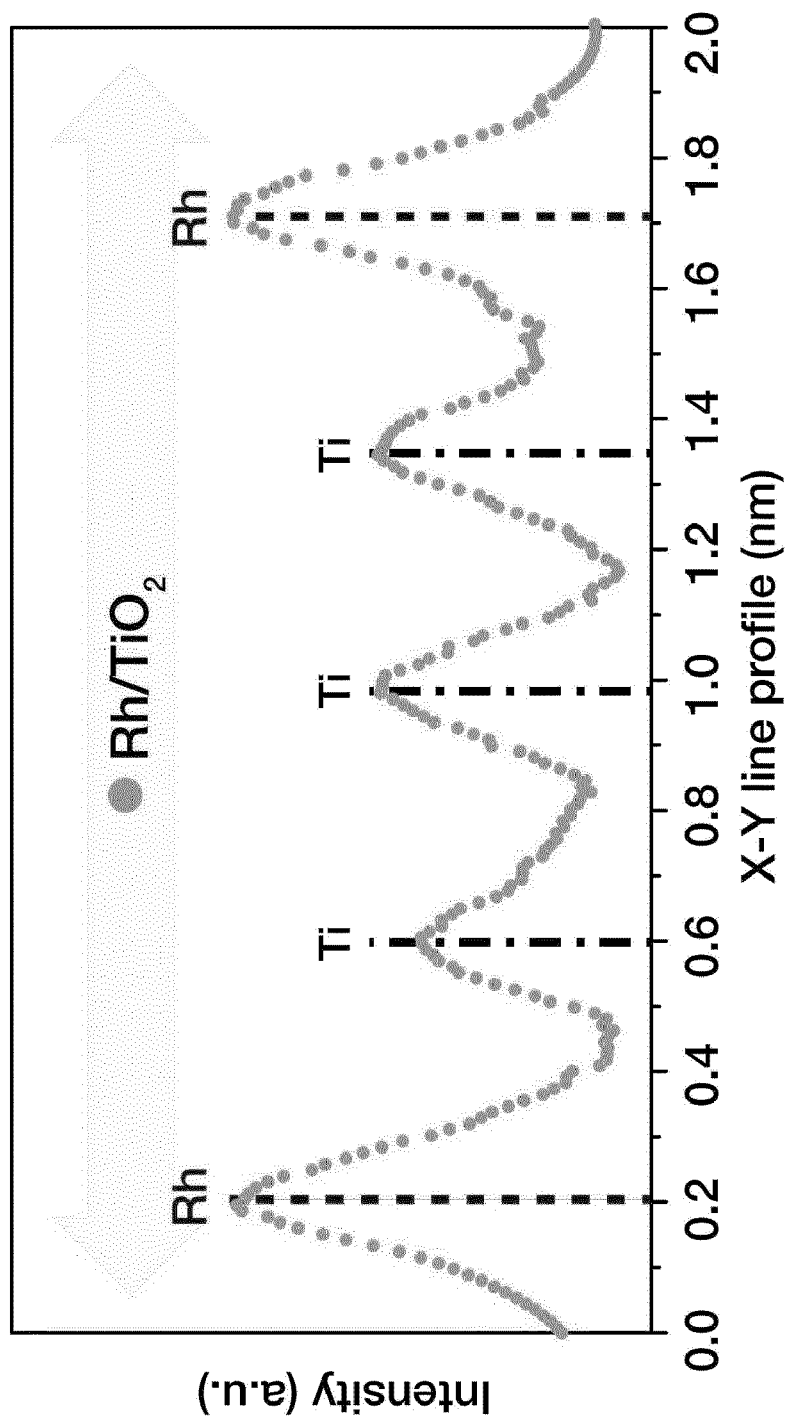
FIG. 15 shows XY line scan profile of $Rh/TiO_2$.

FIG. 7 shows a TEM image of Cu/TiO$_2$ and FIG. 8 shows STEM-EDS elemental mapping of Cu/TiO$_2$. FIG. 9 shows Cu Kedge XANES spectra of Cu/TiO$_2$ and FIG. 10 shows EXAFS spectra and analysis of Cu/TiO$_2$ at Ti and Cu K-edges. FIG. 11 shows simulated HAADF-STEM image of anatase TiO$_2$ and FIGS. 12 and 13 are Cs-corrected HAADF-STEM image of anatase TiO$_2$. FIG. 14 shows Fourier transform pattern of Rh/TiO$_2$ and FIG. 15 shows XY line scan profile of Rh/TiO$_2$.

Referring to FIG. 7, according to the TEM image, the well-dispersed Cu/TiO$_2$ nanoparticles comprise about 5 nm TiO$_2$ nanocrystal. Without protection by the SiO$_2$ coating layer, severe agglomeration may occur.

Referring to FIG. 8, energy dispersive X-ray spectroscopy (EDS) analysis in STEM mode shows a uniform dispersion of non-agglomerated copper species.

Referring to FIG. 9, X-ray absorption near edge structure (XANES) spectroscopy shows an absorption energy at 8996.3 eV and a small shoulder at 8989.3 eV in the initial white Cu/TiO$_2$ film, which are typical characteristics of $Cu^{II}$.

Referring to FIG. 10, Ti K edge spectra from extended X-ray-absorption fine-structure (EXAFS) analysis show the existence of two characteristic distances, Ti-O and Ti-Ti, in the crystalline anatase phase. The EXAFS spectrum of the Cu K edge is very similar to the EXAFS spectrum of the Ti K edge, indicating that the metal atoms are located at the Ti site. The site-specific configuration results in not only a main peak corresponding to the direct binding of copper atoms and lattice oxygen (Cu-O), but also a minor peak indicating the local TiO$_2$ environment (Cu-Ti) around the isolated copper. The local coordination environment is investigated by EXAFS curve-fitting analysis. The best-fitting curve shows that the first peak originates from the first Cu-O shell coordination, whereas the minor second peak originates from the Cu-Ti contribution.

Referring to FIGS. 11 to 15, according to the method of forming a single atom catalyst of the present invention, it is possible to form single atom catalysts that are highly loaded with atomically dispersed metals including Cu, Fe, Co, Ni and Rh exclusively in the Ti vacancies of the hollow TiO$_2$ nanoparticles. The bright contrast spots are located only on the Ti atomic row, confirming that the Rh atoms are exclusively present in the Ti vacancies. In addition, the atomic resolution HAADF-STEM imaging and EXAFS analysis results are consistent and show the homogeneous incorporation of metal atoms in the site-specific Ti vacancies.

Figure 16:
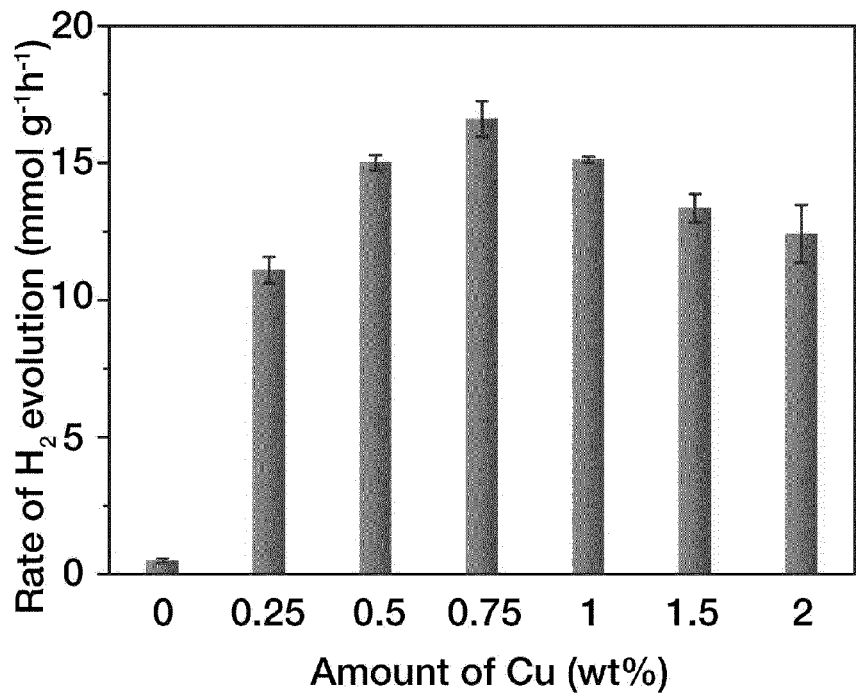
FIG. 16 shows $H_2$ generation rate of $Cu/TiO_2$ depending on the loading amount of Cu.
Figure 17:
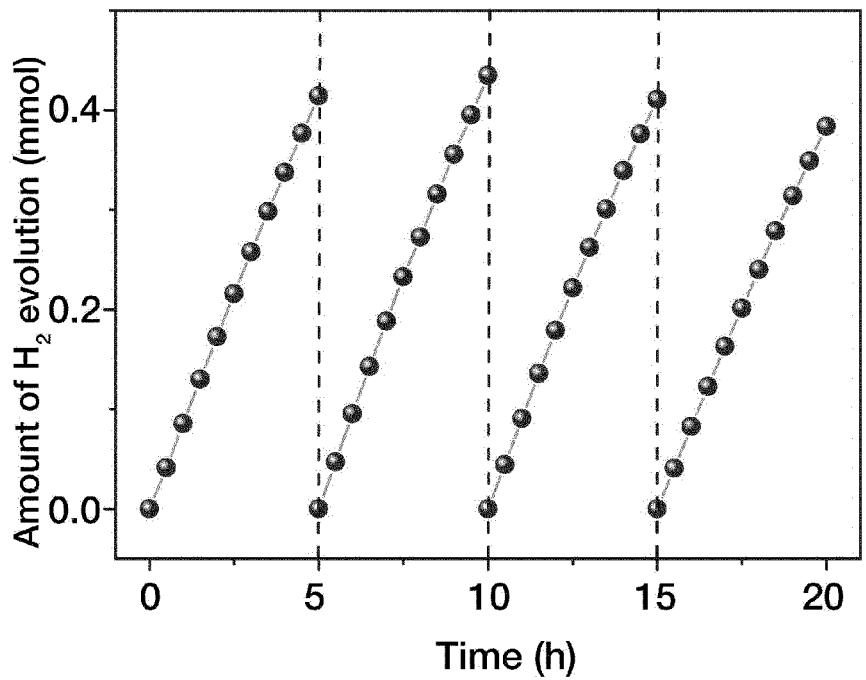
FIG. 17 shows $H_2$ generation cycle of $Cu/TiO_2$.
Figure 18:
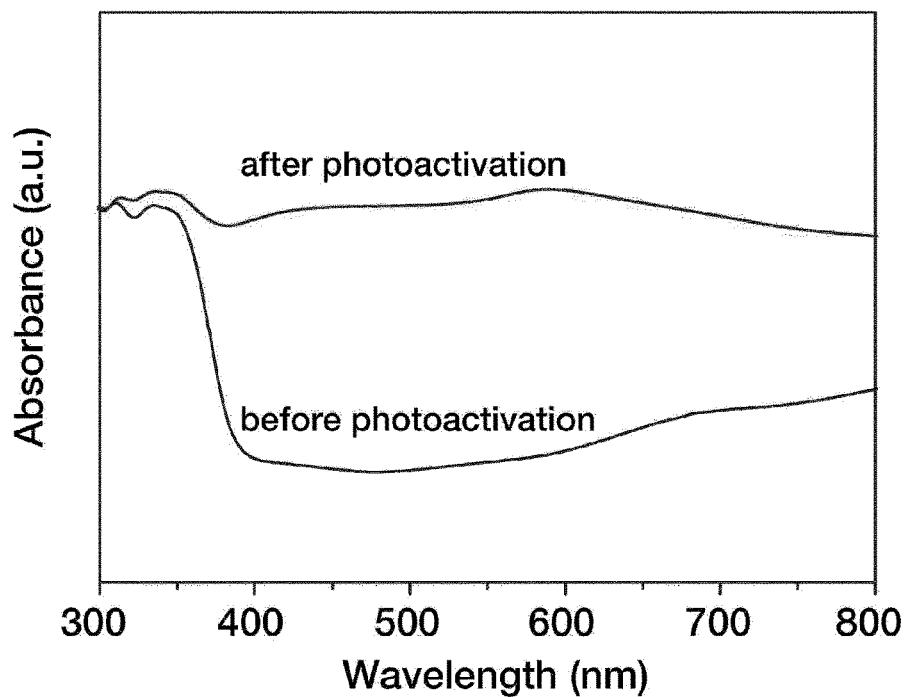
FIG. 18 shows absorbance spectra change of $Cu/TiO_2$ before and after 10 min of light irradiation.
Figure 19:
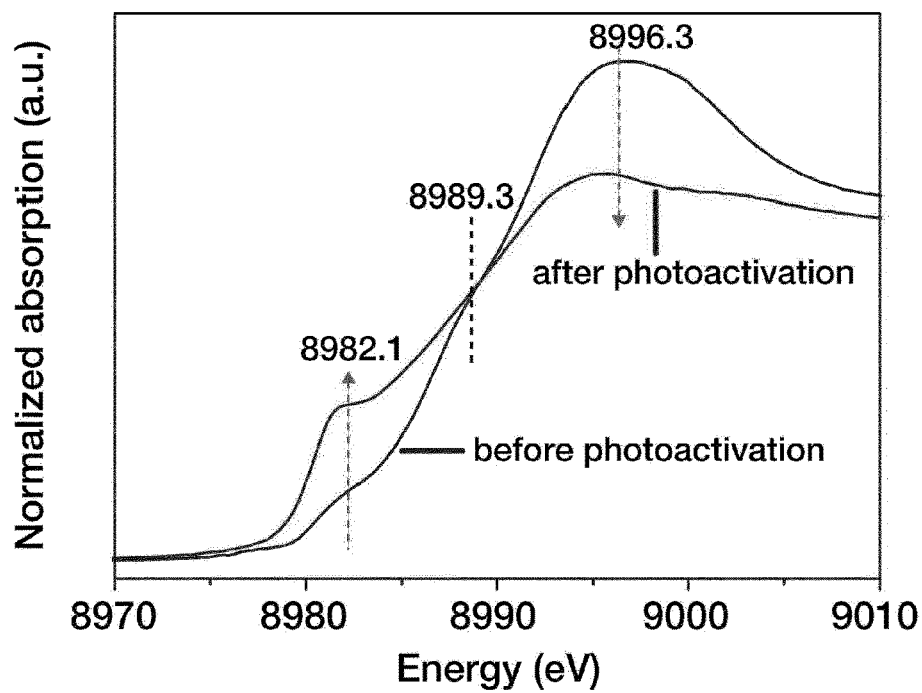
FIG. 19 shows Cu K-edge XANES spectra of $Cu/TiO_2$ before and after 10 min of light irradiation.
Figure 20:
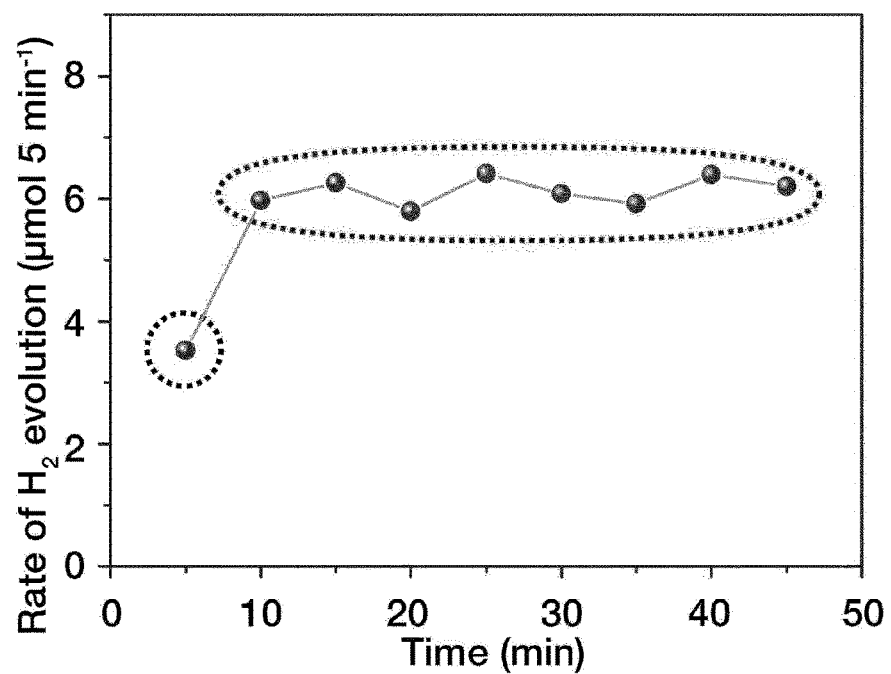
FIG. 20 shows $H_2$ evolution rate of $Cu/TiO_2$ depending time.
Figure 21:
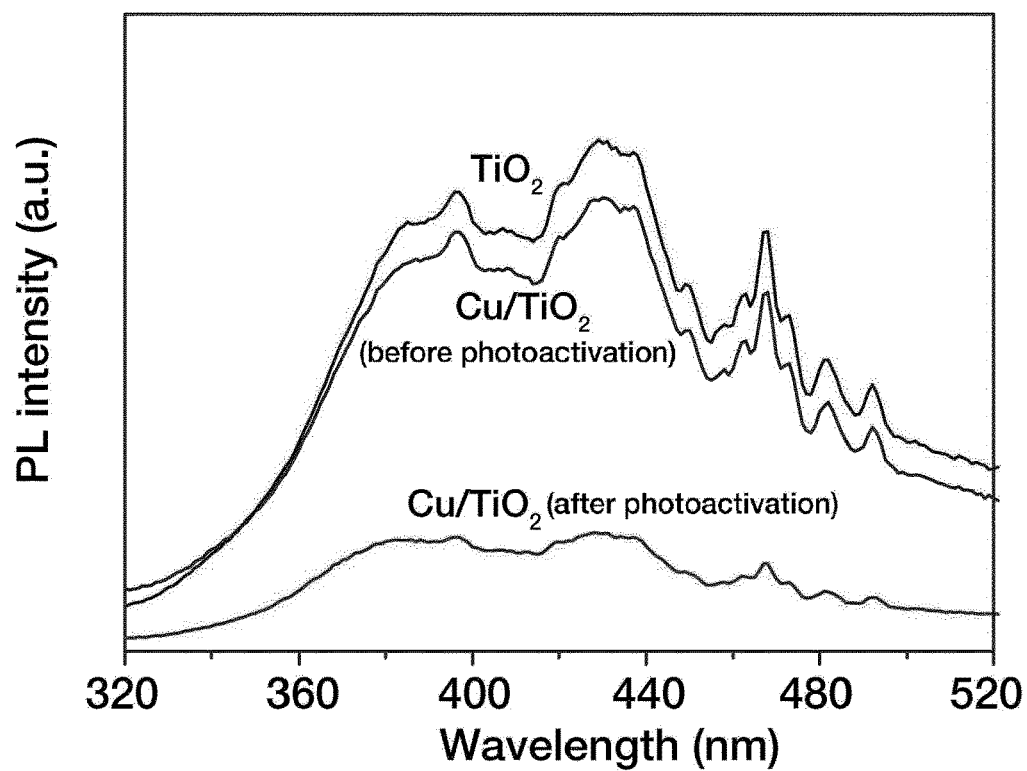
FIG. 21 shows photoluminescence spectra of $Cu/TiO_2$ before and after 10 min of light irradiation.

FIG. 16 shows H$_2$ generation rate of Cu/TiO$_2$ depending on the loading amount of Cu and FIG. 17 shows H$_2$ generation cycle of Cu/TiO$_2$. FIG. 18 shows absorbance spectra change of Cu/TiO$_2$ before and after 10 min of light irradiation and FIG. 19 shows Cu K-edge XANES spectra of Cu/TiO$_2$ before and after 10 min of light irradiation. FIG. 20 shows H$_2$ evolution rate of Cu/TiO$_2$ depending time and FIG. 21 shows photoluminescence spectra of Cu/TiO$_2$ before and after 10 min of light irradiation.

Referring to FIGS. 16 and 17, the H$_2$ production rate of the Cu/TiO$_2$ photocatalyst containing 0.75 wt % copper was the highest as 16.6 mmol/gh. The photocatalytic activity did not decrease significantly and remained stable while H$_2$ production was carried out for 4 consecutive cycles. The optimized 0.75 wt % $Cu/TiO_2$ photocatalyst shows an apparent quantum efficiency (AQE) of 45.5% at 340 nm, far exceeding the apparent quantum efficiency of conventional $TiO_2$-based photocatalysts.

Referring to FIG. 18, as revealed by the difference in color between the resting state sample and the active state sample, the UV-vis absorption spectra show totally different patterns. The resting state sample shows a sharp onset at about 390 nm and a broad band at 700 nm corresponding to the band-band transition of anatase $TiO_2$ and the d-d transition of Cu, respectively (black curve). The active-state sample shows very strong absorption in the whole range of measured wavelengths (300-800 nm) (red curve).

Referring to FIG. 19, the valence state change of isolated copper during the photoactivation process can be confirmed by XANES measurement. When the resting state sample is irradiated, a distinct shoulder at 8982.1 eV develops and the main peak at 8996.3 eV decreases, showing that the valence of the copper is reduced by photo-generated electrons. Considering the homogeneously distributed Cu atoms, the drastic change in absorption properties can be attributed to the cooperative photoactivation and subsedquential lattice distortion initiated by photo-generated electrons in between isolated copper atoms and local $TiO_2$ environment.

Referring to FIG. 20, the rate of $H_2$ evolution rapidly increased during the first 10 min of light irradiation and remained nearly constant afterwards.

Referring to FIG. 21, the photoluminescence spectrum of the initial resting state (CT0, black line) is almost identical to that of bare $TiO_2$ (blue line), showing that efficient separation of charge carriers does not occur before the light activation. The photoluminescence spectra of the active state (CT3, red line) significantly decreased, revealing that the initial white $Cu/TiO_2$ (CT0, resting state) is dormant and that the generated black $Cu/TiO_2$ (CT3, active state) has the exceptional photocatalytic activity.

Figure 22:
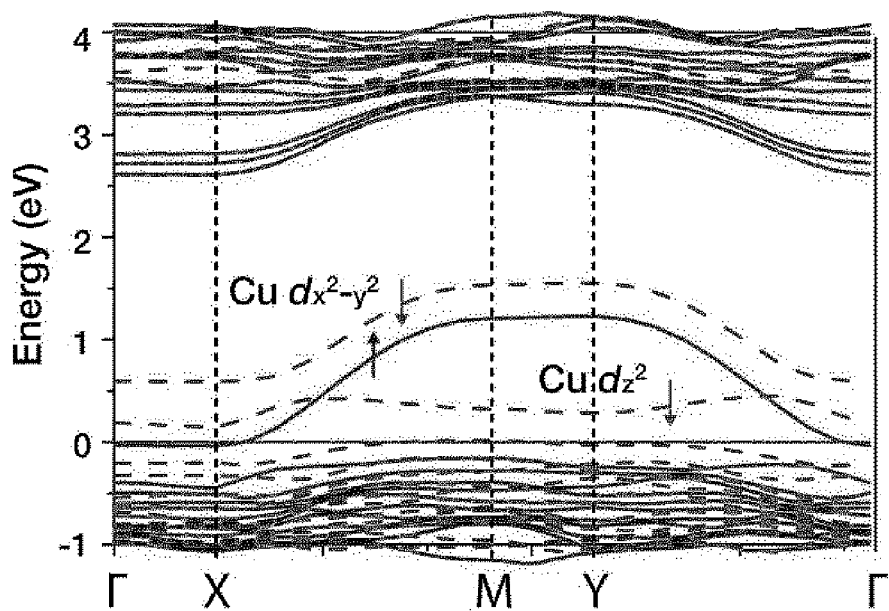
FIGS. 22 to 24 are views for explaining role of isolated Cu atoms in the cooperative interplay of Cu and $TiO_2$.
Figure 23:
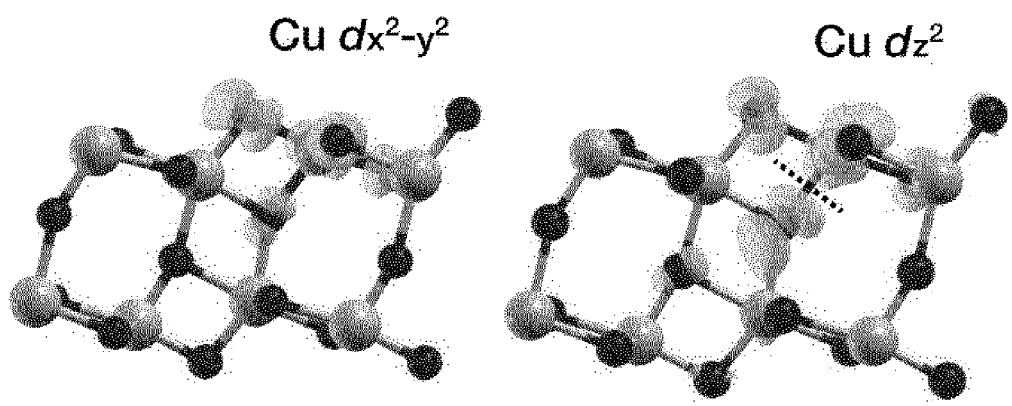
Figure 24:
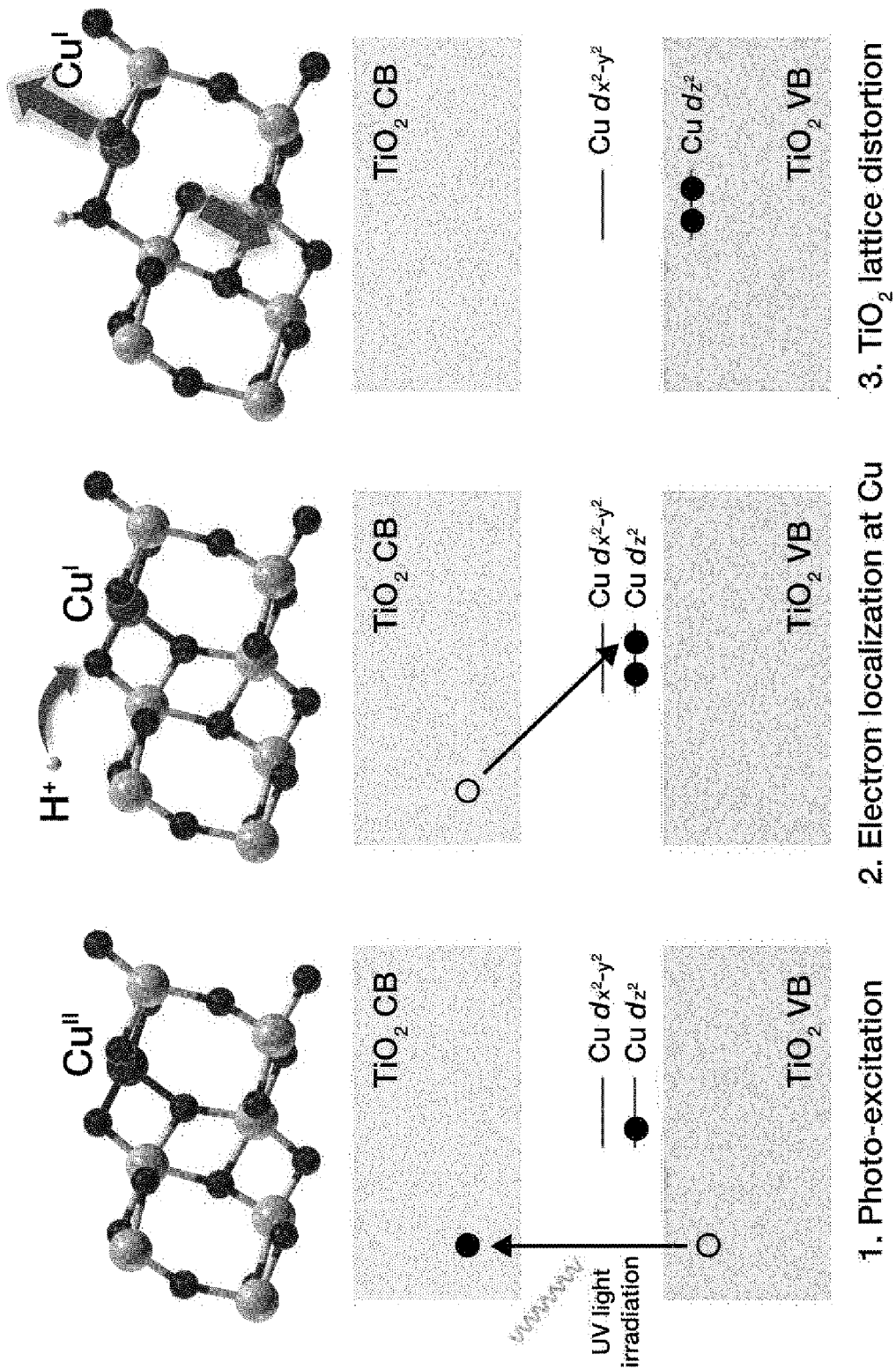

FIGS. 22 to 24 are views for explaining role of isolated Cu atoms in the cooperative interplay of Cu and $TiO_2$.

Referring to FIGS. 22 and 23, DFT calculations elucidate that Cu atom in Ti vacancy provides mid-gap states with Cu $dx^2-y^2$ and $dz^2$ characteristic in between the valence and conduction bands of $TiO_2$.

Referring to FIG. 24, after the photo-excitation (left of FIG. 24), the photo-generated electron is localized into the Cu $dz^2$ state and changes the valence state of Cu atom. An additional proton needs to be adsorbed on the surface to balance the surface charge (middle of FIG. 24). The photo-generated electron of the bare $TiO_2$ surface remains delocalized in the conduction band of $TiO_2$, rather than being localized at the metal center due to the absence of Cu redox center. Since the Cu $dz^2$ state has an axial anti-bonding characteristic, electron localization at this state leads to a lattice distortion by elongating of the backside oxygen coordination from 2.005 Å to 2.321 Å (right of FIG. 24), which not only stabilizes the localized electron at Cu, but also causes lattice distortion in nearby $TiO_2$. Consequently, isolated copper acts as a redox active metal cofactor that reversibly tune local $TiO_2$ lattice during dynamic photocatalysis. During the dynamic photocatalytic process, the valence state of the isolated Cu atoms is changed by the atomistic localization of photo-generated electrons. This valence change induces the activation of adjacent $TiO_2$, thereby tuning the initially dormant $TiO_2$ to active state that significantly enhance photocatalytic performance.

Although the embodiments of the present invention have been disclosed for illustrative purposes, those skilled in the art will appreciate that the present invention may be embodied in other specific ways without changing the technical spirit or essential features thereof. Therefore, the embodiments disclosed in the present invention are not restrictive but are illustrative. The scope of the present invention is given by the claims, rather than the specification, and also contains all modifications within the meaning and range equivalent to the claims.

Industrial Applicability

A single atom catalyst according to embodiments of the present invention may have good performance. The single atom catalyst can achieve uniquely improved catalytic performance by adjusting local atomic composition for a single atom fixed to a support. In addition, the single atom catalyst may have good photocatalytic properties. The single atom catalyst can be easily formed in a simple way.

The invention claimed is:
1. A single atom catalyst comprising:
a support having a hollow structure; and
a transition metal atom located on the support,
wherein the support comprises a metal oxide, and the transition metal atom is located in a metal vacancy in the metal oxide.
2. The single atom catalyst of claim 1, wherein the metal oxide comprises $TiO_2$.
3. The single atom catalyst of claim 1, wherein the transition metal atom comprises at least one of Cu, Fe, Co, Ni, and Rh.
4. The single atom catalyst of claim 1, wherein the support has a spherical shape.
5. The single atom catalyst of claim 1, wherein the metal oxide has crystalline property.
6. The single atom catalyst of claim 1, wherein the single atom catalyst is activated by light irradiation and deactivated by exposure to oxygen.

* * * * *